Oct. 19, 1954
L. A. PAINE
2,692,179
THERMAL VOLTMETER
Filed Sept. 29, 1950
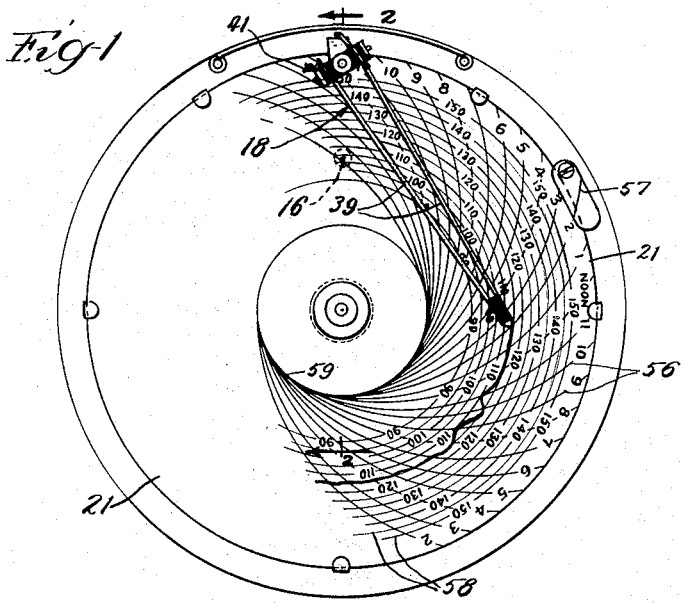
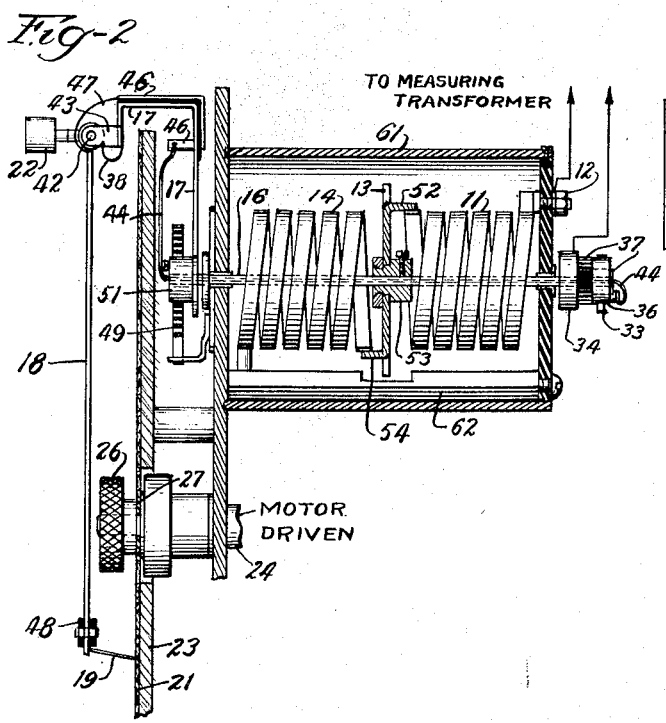
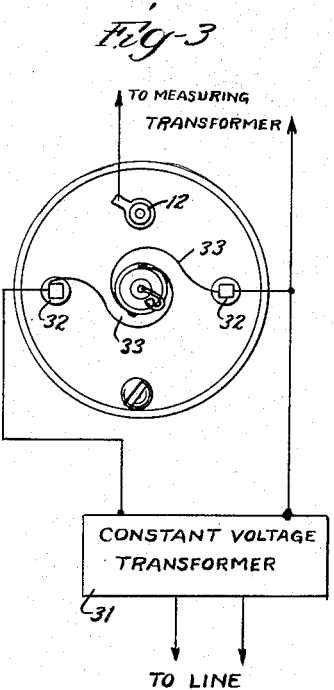
INVENTOR.
Louis A. Paine
BY
Louis Robertson
Atty.

Patented Oct. 19, 1954

2,692,179

UNITED STATES PATENT OFFICE 2,692,179

THERMAL VOLTMETER

Louis A. Paine, West Lafayette, Ind., assignor to Duncan Electric Manufacturing Company, Lafayette, Ind., a corporation of Illinois Application September 29, 1950, Serial No. 187,517

7 Claims. (Cl. 346—139)

Although recording thermal volt meters have long been proposed, those which have been built have not usually been extremely accurate. According to the present invention, several novel features combine to provide a recording volt meter of exceptional accuracy.

According to one feature, the measuring bi-metal and the compensating bi-metal are both secured to the indicator shaft by means of a metal disk, the two bi-metals being connected to opposite sides of this disk. The disk serves to dissipate heat at a desirable rate while still maintaining the proper angular relationship between the two bi-metals, maintaining some heat conductivity between them, and maintaining heat and electrical conductivity to the shaft.

According to another feature of the invention, a practical form of heated stylus is provided so that the friction of marking the chart can be reduced to a point where it produces substantially no inaccuracy. Contributing to this feature is the provision for connections to the heated stylus. The indicator arm itself is formed of two slim rods which form the conductors. These are connected respectively through a slim tube forming the shaft of the thermal unit and a coated wire passing through this slim tube; connections free from sliding contact and incapable of producing appreciable inaccuracy being made through flat silver hair-springs.

Accuracy in reading the chart is improved by mounting the stylus with a path of movement beginning approximately tangent to the blank central area of the chart so that the useful part of its movement in the vicinity of the voltage being recorded will be relatively expanded to provide clear open readings.

Additional objects and advantages of the invention will be apparent from the description and from the drawings.

Designation of figures

Figure 1 is a face view of a meter chosen for illustration of the invention, the cover being removed.

Figure 2 is a fragmentary vertical sectional view taken approximately on the line 2—2 of Fig. 1, but with the recording arm approximately at its zero position.

Figure 3 is a rear view of the measuring unit with circuit connections shown diagrammatically.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description

The illustrated form of meter includes a bi-metallic coil 11 which is the main measuring element. Current proportional to the voltage to be measured is passed through this coil by terminal 12 and a disk 13 connected at opposite ends to the coil 11. A second bi-metallic coil 14, identical with coil 11, serves as a compensating coil to compensate for ambient temperature changes. The disk 13 turns tubular shaft 16. A bracket 17 is rigidly carried by shaft 16 and recorder arm 18 is pivotally carried by bracket 17. At the end of arm 18 a hot wire stylus 19 is provided. As stylus 19 is pressed lightly against chart 21 by a weight 22, the chart 21 rests against plate 23 and is driven at a constant speed by shaft 24. Charts may be replaced by removing knob 26 which, when tightened, clamps the chart to hub 27 carried by shaft 24. The chart 21 is preferably one which has a wax coating of fairly high melting point. The high melting point prevents loss of the record due to ordinary ambient temperatures. The wax nevertheless melts under the stylus to produce a very clear recording line and the melted wax substantially eliminates frictional opposition to the movement of stylus 19 as recording arm 18 seeks its true position.

Stylus circuit

It has long been recognized that a heated stylus is an ideal instrumentality for chart marking. In addition to virtually eliminating inaccuracy by reducing friction when a wax coated chart is used, a heated stylus is potentially very desirable because of its long operation without servicing, as compared to an ink or pencil stylus. The popularity of heated stylus instruments has nevertheless been reduced by lack of dependability, uniformity and economy. The present invention, however, provides a very simple construction which provides dependable uniformity.

Uniformity of voltage for the stylus circuit is obtained by a constant voltage transformer 31. The output of this transformer may be connected to two terminals 32. Each of these terminals 32 is connected by a hair spring 33 to one of the collars 34 and 36. Collar 34, to which one terminal 32 is connected, is mounted directly on shaft 16.

Collar 36, which is connected to the other terminal 32, is mounted on an insulating collar 37 pressed on shaft 16. The current passing through tubular shaft 16 passes directly to bracket 17, from which it passes through a hair spring 38 to one of the wires 39, which jointly make up recording arm 18. The wires 39 are carried by a block 41 of insulating material having lugs 42 at its ends, by which it is pivoted to ears 43 formed on bracket 17. From the collar 36, the stylus circuit extends through a wire 44, which extends through tubular shaft 16. The wire 44 is of course insulated and may be of a conventional type having an insulating coating of enamel or lacquer. One end of wire 44 is soldered to collar 36 and the other is soldered to a conductor 46 which is carried by but insulated from bracket 17. A hair spring 47 connects conductor 46 with the second of the wires 39. The stylus 19 is soldered to the lower ends of wires 39. The wires 39 may be bound to an insulating block 48 for greater rigidity of the recording arm construction.

The hair springs or filaments 33, 38 and 47 are preferably very thin, soft, flat bands of pure silver, although aluminum could be used. The hair springs 33, especially, are preferably of sufficient length so that they act as hair springs rather than acquiring changing permanent sets. Thus springs 33 merely serve part of the conventional purpose of the hair spring 49 rather than having even a minute effect on the accuracy of the meter due to erratic resistance to flexing. The bracket 17 is secured to shaft 16 by a set screw or a ball and set screw combination in hub 51, by which the bracket 17 is directly carried. The hair spring 49 is secured at one end to the hub 51, its other end preferably being adjustably positioned for zero-setting of the meter.

Measuring circuit

The circuit to be measured or the output coil of a measuring transformer therein is connected to terminal 12 and to one of the terminals 32, specifically the one to which collar 34 is connected by a hair spring 33. As previously mentioned, the measuring bi-metal 11 is connected at one end to the terminal 12 and at the other end to disk 13'. More specifically, the bi-metallic coil 11 is soldered to a lug 52, bent up from disk 13. Disk 13 is connected by a set screw in its hub 53 to tubular shaft 16. Thus the remainder of the measuring circuit is through the shaft 16, collar 34 and its associated hair spring 33.

Heat-dissipating disk

Before the present invention, the two coils 11 and 14 have usually been made as one continuous coil connected at a midpoint to the shaft 16 by a rigid arm thereon. Better results are obtained by the use of a heat-dissipating disk 13, especially when the coils 11 and 14 are connected to diametrically opposite sides of the disk 13. Thus, the coil 14 may be soldered to a lug 54 bent up from disk 13 at a position approximately diametrically opposed to the position of lug 52. With this arrangement, it has been found that the disk 13 dissipates enough of the heat conducted to it from the coil 11 so that there is no excessive heating of coil 14 to produce objectionable creepage of the recording arm. The coil 14 does not need to carry any current and it may therefore be connected to shaft 16 by a separate arm which could be of insulative material. The present construction is simpler, however, and, perhaps surprisingly, seems to be even better. The better result follows from the fact that the coil 14 draws some heat from disk 13, even if very little. In other words, the illustrated construction seems to result in just the right amount of heat transfer from disk 13 to coil 14. This shortens the cooling cycle after reduction of the voltage measured and may improve the compensating action.

Wide variations may be possible in the dimensions and materials, but it may be helpful to note that a disk 13' of copper, $\frac{1}{32}$" thick and 1¼" in diameter, has been found to give very satisfactory results. The bi-metal used was that sold under the trade-mark "Morflex." A quick-heating cycle was obtained, namely, 90% in sixty seconds.

The recording arm 18 may be replaced by a contact arm operating between fixed contacts to provide a voltage relay, the advantages of disk 13 nevertheless being attained.

Path of stylus

Although the foregoing features produce a meter with a high degree of accuracy, this would be of little avail unless the meter could be read accurately. Furthermore, no commercial meter can quite reach exact accuracy dependably. For both of these reasons, it is desirable that the stylus have a relatively large or "expanded" movement across that part of the chart along which it usually operates. With a given amount of space available on the chart, the best use of this space presents a very difficult problem. Of course, if the bi-metal were so designed as to tend to give the stylus a swing of 6", a stop could theoretically be positioned to confine its swing to 2". However, any such confinement of the recording arm is undesirable because it prevents having a zero mark to which the arm returns and which serves as a ready check against possible changes which would cause inaccuracies. In this instance the zero mark is on plate 23. According to the present invention, an expanded effect for the upper part of the range is accomplished without any artificial restriction of movement by arranging the parts so that the stylus, when near the zero position, moves approximately tangentially along a circle close to the center of the disk. Quite a little of its low-range movement may thus be spent with very little movement radially of the disk, leaving almost the entire useful area of the chart for the movement of the stylus in its more usual positions.

The chart 21 shown in Fig. 1 represents a volt meter chart which rotates once in twenty-four hours, the time being indicated by the approximately spiral lines as they pass under a marker 57. The voltage is indicated by circular lines 58, which are concentric about the center of the chart. The stylus is so mounted that if the chart were stationary, it would move back and forth along one of the lines 56. Thus the stylus rotates about the shaft 16 which has been shown in dotted lines in Fig. 1. Of course the linear movement of the stylus depends upon the effective length of the arm as well as on the angular movement of the arm.

In some respects, the results of this invention would be accomplished even more effectively if the shaft 16 were raised high enough without changing anything else, so that the stylus moved approximately tangentially with respect to the upper part of the inner circle 59 instead of along the lower part of the circle. It would then move across the more active part of the chart, in the region of the line indicating 120-volts with a more nearly radial movement. The illustrated position for shaft 16 is nevertheless preferred, because it produces a more compact meter without very serious loss in readability in the useful range.

Furthermore, the illustrated meter has surprising uniformity throughout the useful range from 90-volt to 150-volt. Thus the voltage circles may be spaced uniformly, as shown. Approximate dimensions found to be satisfactory in this regard are, from the chart axis: 1⅞" to the axes of shaft 16, 1" to the 0" position of the stylus (inner circle 59), 1 9/16" to the 90-volt circle and 2 11/16" to the 150-volt circle. To some extent the result is obtained whenever the axis of shaft 16 is within the 150-volt (outer) circle. Of course, it must be substantially closer to it than to the 0" point at the far side of the inner circle.

The cylinder or housing 61 is preferably of metal to help conduct heat. Some housing is desirable as protection against varying air movements. The housing 61 may help support the insulative end closure carrying terminal 12, shaft 16, etc., but bar 62 is mainly relied on for such support.

I claim:

1. A thermal meter or the like including a shaft, a bi-metal coil connected at one end to a fixed terminal for carrying current to be measured, a compensating bi-metal coil connected at one end to a fixed point, and a metallic disk of high conductivity rigidly mounted on the shaft in electrically conductive relation thereto, connected at one side to one of said bi-metal coils and at a substantially diametrically opposite side to the other of the bimetal coils, and means for connecting said shaft to the circuit being measured.

2. A chart meter including means for mounting a chart to rotate about a chart axis, a metering element including a shaft rotatable about a shaft axis substantially displaced from the chart axis, means for producing indications on the chart including an arm carried by said shaft, and an indicator unit carried by the arm, the effective length of the arm being greater than the distance between said axes so that when the arm passes near the chart axis, the indicator unit moves approximately tangentially to the side remote from said shaft axis of a circle concentric with the chart axis and close to the chart axis but spaced therefrom, further movement of the shaft moving the indicator unit outwardly from the said circle to steeply cross circles concentric therewith and successively larger.

3. A chart meter including means for mounting a chart to rotate about a chart axis, a metering element including a shaft rotatable about a shaft axis substantially displaced from the chart axis, means for producing indications on the chart including an arm carried by said shaft, and an indicator unit carried by the arm, the effective length of the arm being substantially different from the spacing between said axes so that when the shaft moves the arm into the common plane of said axes, the indicator unit moves approximately tangentially to a circle concentric with the chart axis and close to the chart axis but spaced therefrom, further movement of the shaft moving the indicator unit outwardly from the said circle to steeply cross circles concentric therewith and successively larger.

4. A chart meter including means for mounting a chart to rotate about a chart axis, a metering element including a shaft rotatable about a shaft axis substantially displaced from the chart axis, means for producing indications on the chart including an arm carried by said shaft, and an indicator unit carried by the arm, the effective length of the arm being greater than the distance between said axes so that when the arm passes near the chart axis, the indicator unit moves approximately tangentially to the side remote from said shaft axis of a circle concentric with the chart axis and close to the chart axis but spaced therefrom, further movement of the shaft moving the indicator unit outwardly from the said circle to steeply cross circles concentric therewith and successively larger; said shaft axis lying closer to the chart axis than the radius of the space provided for the chart.

5. A thermal meter, including a tubular shaft, bi-metallic means for rotating the shaft, a carrier of high conductivity fixed to the shaft and electrically connected thereto, an arm pivotally connected to the carrier, including a stylus formed of resistance wire at its end and two conductors connected to opposite ends of the stylus and extending substantially the length of the arm, a coated wire passing through said tubular shaft and flat silver filaments of coil-like arrangement connecting one of said conductors to said wire, connecting the other of said conductors to said carrier and connecting said tube and said wire to terminals.

6. A thermal meter, including a tubular shaft, bimetallic means for rotating the shaft, a carrier of high conductivity fixed to the shaft and electrically connected thereto, an arm pivotally connected to the carrier, including a stylus formed of resistance wire at its end and two conductors connected to opposite ends of the stylus and extending substantially the length of the arm, a coated wire passing through said tubular shaft and flat silver filaments of coil-like arrangement connecting one of said conductors to said wire, connecting the other of said conductors to said carrier and connecting said tubular shaft and said wire to terminals, said bi-metallic means including a bimetal coil connected at one end to a fixed terminal for carrying current to be measured, a compensating bi-metal coil connected at one end to a fixed point, and a metallic disk of high conductivity rigidly mounted on the shaft in electrically conductive relation thereto, connected at one side to one of said bi-metal coils and at a substantially diametrically opposite side to the other of the bi-metal coils.

7. A thermal meter, including a tubular shaft, bi-metallic means for rotating the shaft, a carrier of high conductivity fixed to the shaft and electrically connected thereto, an arm pivotally connected to the carrier, including a stylus formed of resistance wire at its end and two conductors connected to opposite ends of the stylus and extending substantially the length of the arm, a coated wire passing through said tubular shaft and flat silver filaments of coil-like arrangement connecting one of said conductors to said wire, connecting the other of said conductors to said carrier and connecting said tubular shaft and said wire to terminals, said bi-metallic means including a bi-metal coil connected at one end to a fixed terminal for carrying current to be measured, a compensating bi-metal coil connected at one end to a fixed point, and a metallic disk of high conductivity rigidly mounted on the shaft in electrically conductive relation thereto, connected at one side to one of said bi-metal coils and at a substantially diametrically opposite side to the other of the bi-metal coils, and a chart rotating about an axis so positioned that the stylus moves approximately tangentially adjacent a small circle near and concentric with the chart axis and steeply crosses larger circles concentric with said axis.

References Cited in the file of this patent

UNITED STATES PATENTS

| Number | Name | Date |
|---|---|---|
| 1,765,988 | Mayer et al. | June 24, 1930 |
| 1,833,233 | Sieber | Nov. 24, 1931 |
| 2,186,517 | Bradford | Jan. 9, 1940 |
| 2,454,966 | Faus | Nov. 30, 1948 |

FOREIGN PATENTS

| Number | Country | Date |
|---|---|---|
| 327,873 | Germany | Oct. 20, 1930 |